3,156,669
THERMAL STABILIZATION OF OXYMETHYLENE POLYMERS BY THE USE OF MALEURATE ESTERS
Raymond J. Kray, Berkeley Heights, and Thomas J. Dolce, Summit, N.J., assignors to Celanese Corporation of America, New York, N.Y., a corporation of Delaware
No Drawing. Filed Jan. 27, 1960, Ser. No. 4,881
19 Claims. (Cl. 260—45.85)

This invention relates to polymers which are structurally related to polyoxymethylene and particularly to polymers of high thermal stability. This invention also relates to a method for improving the thermal stability of polymers.

Polyoxymethylene polymers, having recurring

—CH$_2$O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Serial No. 691,143, filed October 21, 1957 by Hudgin and Berardinelli, now issued as U.S. Patent No. 2,989,506 of June 20, 1961.

Although polyoxymethylenes prepared by some methods are much more stable against thermal degradation than those prepared by other methods, it is nevertheless desirable for many uses that the thermal stability be increased.

In accordance with the present invention the heat stability of oxymethylene polymer is enhanced by the incorporation therein of an aliphatic acylurea. Aliphatic acylureas may be designated by the formula

where $R_1$ is an aliphatic radical and $R_2$ is selected from the group consisting of hydrogen and aliphatic radicals. Hydrogen is preferred at $R_2$. $R_1$ may be a hydrocarbon radical, such as a methyl, ethyl, vinyl, allyl, isobutyl or dodecyl radical, but preferably $R_1$ is a radical having at least one ester linkage and preferably also having alpha ethylenic unsaturation adjacent to the ester linkage. The preferred stabilizers are the maleurate esters, these may be represented by the formula:

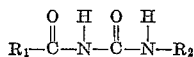

where $R_3$ is the residue of an alcohol and $n$ is an integer. The preferred maleurate esters are those where $n=1$ and $R_3$ is an alkyl group having from one to twelve carbon atoms. Among the suitable maleurate esters which may be used are methyl maleurate, ethyl maleurate, 2-propyl maleurate, isopropyl maleurate, 2-butyl maleurate, cyclohexyl maleurate, benzyl maleurate, allyl maleurate, phenyl maleurate, n-dodecy maleurate, 2-hydroxyethyl maleurate, ethylene dimaleurate, glyceryl trimaleurate and the trimaleurate ester of trimethylolpropane.

If desired, $R_3$ of the above formula may be a long chain or polymeric alcohol such as a hydroxy-terminated polyester.

N-carbonylic esters other than maleurate esters may also be used, such as esters in which an itaconic or citraconic acid residue replaces the maleic acid residue in the maleurate structure. A complete disclosure of the method of preparing maleurate and other N-carbonylic esters may be found in U.S. Patent 2,721,186 of October 18, 1955.

In accordance with a preferred aspect of this invention, the aforesaid aliphatic acylurea is incorporated into a copolymer containing oxymethylene groups, oxyalkylene groups having adjacent carbon atoms, and particularly copolymers containing from 60 to 99.6 mol percent of recurring oxymethylene groups. It appears that the susceptibility of oxymethylene polymers to thermal stabilization by the addition of the aforementioned aliphatic acylurea is enhanced by incorporating into the polymer oxyalkylene units having adjacent carbon atoms and derived from cyclic ethers having adjacent carbon atoms.

Among the copolymers which are utilized in accordance with this aspect of the invention are those having a structure comprising recurring units having the formula

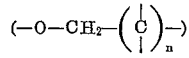

wherein $n$ is an integer from zero to 5 and wherein $n$ is zero in from 60 to 99.6 percent of the recurring units.

A preferred class of copolymers are those having a structure comprising oxymethylene and oxyethylene units wherein from 60 to 99.6 percent of the recurring units are oxymethylene units. These copolymers are prepared by copolymerizing trioxane with a cyclic ether having the structure

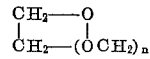

where $n$ is an integer from zero to two.

Among the specific cyclic ethers which may be used are ethylene oxide, 1,3, dioxolane, 2,3,5-trioxepane, 1,3-dioxane, trimethylene oxide, pentamethylene oxide, 1,2-propylene, 1,2-butylene oxide, neopentyl formal, pentaerythritol, diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone, are preferably anhydrous or substantially anhydrous. Small amounts of moisture, such as may be present in commercial grade reactants or may be introduced by contact with atmospheric air will not prevent polymerization, but should be essentially removed for highest molecular weights.

In preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in copending application S. No. 718,147 filed February 28, 1958 by Donald E. Hudgin and Frank M. Berardinelli, now issued as U.S. Patent No. 2,989,509 of June 20, 1961.

In a preferred embodiment of this invention the polymer composition also contains a phenolic material and preferably an alkylene bisphenol as a thermal stabilizer. It appears that the stabilization action of the aliphatic acylureas and of the phenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenols, octyl phenol and p-phenyl phenol.

The aliphatic acylurea is generally admixed with the oxymethylene polymer in amounts not exceeding 2%, based on the weight of the oxymethylene polymer, and preferably in amounts between about 0.10 and 1.0 weight percent. The alkylene bisphenol, when used, is admixed in amounts not exceeding 2 weight percent and preferably from about 0.1 to about 1 weight percent.

The aliphatic acylureas and the alkylene bisphenols, if desired, may be admixed intimately with the oxymethylene polymer by being applied in solution in a suitable solvent to the finely divided solid oxymethylene polymer followed by evaporation of the solvent. Acetone, ethanol, dioxane, acetonitrile and methanol are typical suitable solvents.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as dimethyl formamide.

The compositions of this invention may also include, if desired, plasticizers, fillers, pigments and other stabilizers against degradation by ultra violet light.

*Example I*

Four batches of trioxane-dioxolane polymer were prepared and combined. In each batch the trioxane was combined with one-fourth its weight of cyclohexane, 5.0% of its weight of dioxolane and enough boron fluoride dibutyl etherate to provide a boron fluoride concentration of 65 parts per million (based on trioxane). The polymerization reactions were run for two hours in a Baker-Perkins mixer with temperatures varying from 54° to 66° C. The combined products had an inherent viscosity of 1.4 (measured in 0.1% weight solution in p-chlorophenol containing 2 weight percent of α pinene).

To 40 parts by weight of the above copolymer were added 0.4 part of recrystallized butyl maleurate and 0.4 part of 2,2'-methylene-bis-(4-methyl-6-tert. butyl phenol). The powders were mixed by tumbling and then milled at 200–212° C. for 30 minutes under nitrogen in a heated chamber having a pair of counter-rotating screws. The thermal degradation rate of the thus heated copolymer (measured in an open vessel a circulating air oven) was 0.05 wt. percent/min. The degradation rate of the copolymer prior to treatment was 3.0 wt. percent/min.

*Example II*

The copolymer of Example I was mixed by tumbling with the stabilizers of Example I in the same proportion as described therein. The mixed powder was extruded into a rod of ¼" diameter through a 1" extruder in which the barrel temperature was 360° F. and the die temperature was 390° F. The extrudate was chipped and placed in a 20 liter oven at 160° C. into which a constant stream of nitrogen (about 1.5 liters/min.) was fed. At hourly intervals samples were taken and the degradation rate was determined (at 222° C. in an open vessel in a circulatory air oven). The results were as follows:

Time of treatment at
  160° C. (hrs.):
                        Degradation rate (wt. percent/min.)
  1 _____ 0.16 for first 3% of polymer
                            degraded 0.09 for remainder.
  2 _____ 0.11.
  3 _____ 0.11.
  4 _____ 0.11.

*Example III*

The procedure of Example I was repeated using methyl maleurate instead of butyl maleurate. The degradation rate of the resulting material was 0.04 wt. percent/min.

It is to be understood that the foregoing detailed description is given merely by way of illustration and that many variations may be made therein without departing from the spirit of our invention.

Having described our invention what we desire to secure by Letters Patent is:

1. A polymer composition comprising a moldable oxymethylene polymer and a stabilizing amount of a maleurate ester.

2. A polymer composition comprising a moldable oxymethylene polymer and a stabilizing amount of a maleurate monoester, said oxymethylene polymer containing oxyalkylene groups having more than one carbon atom and containing from 60 to 99.6 mol percent of oxymethylene groups.

3. A polymer composition comprising a moldable oxymethylene polymer and between about 0.1 and 2% of a maleurate ester, said oxymethylene polymer containing oxyethylene groups and containing from 60 to 99.6 mol percent of oxymethylene groups.

4. A polymer composition comprising a moldable oxymethylene polymer and stabilizing amounts of a maleurate ester and an alkylene bisphenol.

5. A polymer composition comprising a moldable oxymethylene polymer and stabilizing amounts of a maleurate monoester and alkylene bisphenol, said oxymethylene polymer containing oxyethylene groups and containing from 60 to 99.6 mol percent of oxymethylene groups.

6. The polymer composition of claim 1 wherein said maleurate ester is an alkyl ester having from one to twelve carbon atoms in its alkyl group.

7. The polymer composition of claim 1 wherein said maleurate ester is butyl maleurate.

8. The polymer composition of claim 1 wherein said maleurate ester is methyl maleurate.

9. The polymer composition of claim 4 wherein said maleurate ester is an alkyl ester having from one to twelve carbon atoms in its alkyl group.

10. The polymer composition of claim 5 wherein said alkylene bisphenol is 2,2'-methylene-bis(4-methyl-6-tertiary butyl phenol).

11. The polymer composition of claim 5 wherein said alkylene bisphenol is 4,4' butylidene-bis (6-tertiary butyl-3-methyl phenol).

12. The polymer composition of claim 5 wherein said alkylene bisphenol is present in amounts between about 0.1% and 2% and said maleurate ester is present in amounts between about 0.1% and 2% based on the weight of oxymethylene polymer.

13. The method of stabilizing a moldable oxymethylene polymer containing oxyethylene groups and containing from 60 to 99.6 mol percent of oxymethylene groups which comprises intimately admixing therewith stabilizing amounts of a maleurate monoester and an alkylene bisphenol.

14. The method of claim 13, wherein said alkylene bisphenol and said maleurate ester are each admixed in amounts between about 0.1% and 2% based on the weight of oxymethylene polymer.

15. The method of claim 14 wherein said maleurate ester and, said alkylene bisphenol are applied in solution to said oxymethylene polymer in finely divided state and the solvent of said solution is thereafter evaporated.

16. The method of claim 14 wherein said maleurate ester and said alkylene bisphenol are compounded in a mill with said oxymethylene polymer in plastic state.

17. A polymer composition comprising a moldable oxymethylene polymer and stabilizing amounts of butyl maleurate and an alkylene bisphenol.

18. A polymer composition comprising a moldable oxymethylene polymer and stabilizing amounts of methyl maleurate and an alkylene bisphenol.

19. A polymer composition comprising a moldable oxymethylene polymer and stabilizing amounts of methyl maleurate and 2,2'-methylene bis(4-methyl-6-tertiary butyl phenol).

References Cited in the file of this patent

UNITED STATES PATENTS

| | | |
|---|---|---|
| 2,854,438 | Snyder et al. | Sept. 30, 1958 |
| 2,893,972 | Kubico et al. | July 7, 1959 |
| 2,894,933 | Schweitzer | July 14, 1959 |
| 2,966,476 | Kralovec et al. | Dec. 27, 1960 |